Aug. 19, 1930.  G. F. RUOPP  1,773,378
PRESSURE GAUGE
Filed March 20, 1928
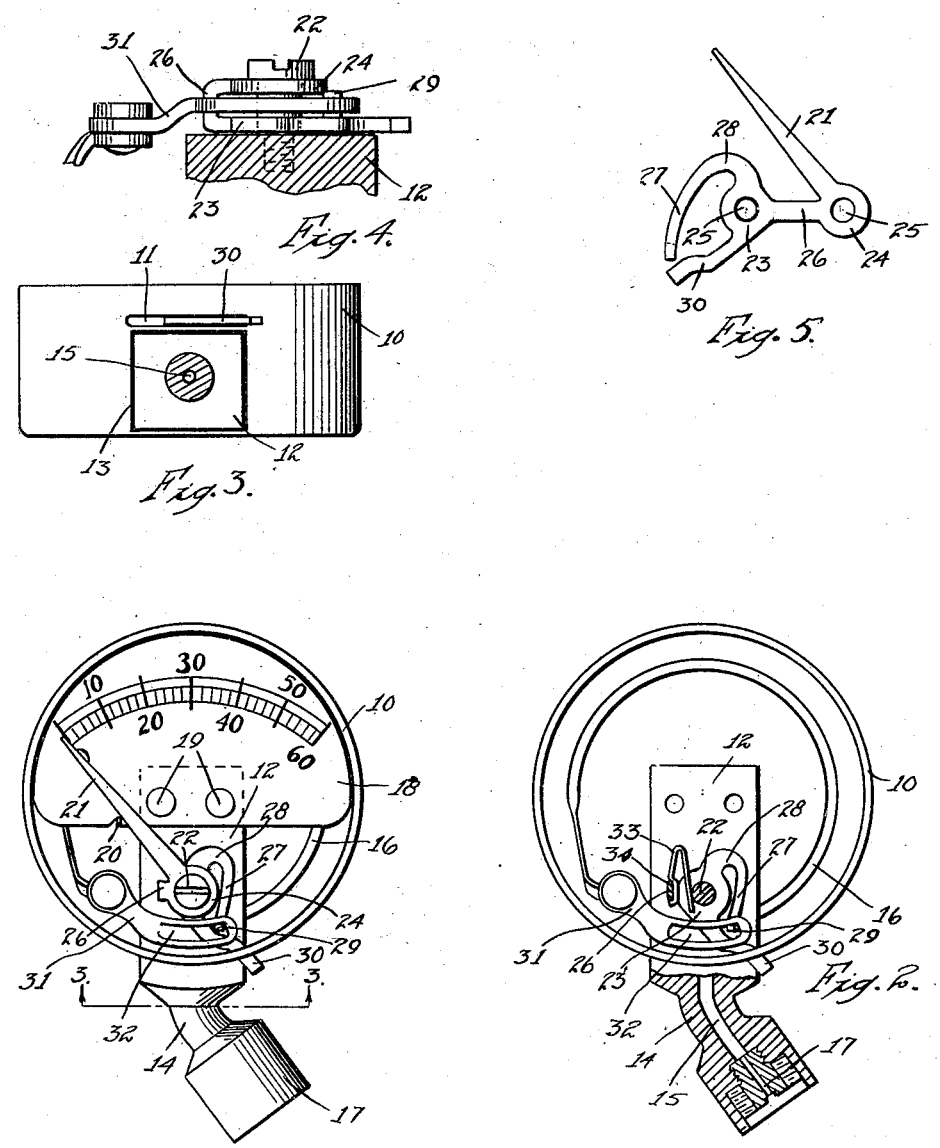

Patented Aug. 19, 1930

1,773,378

UNITED STATES PATENT OFFICE

GEORGE FREDERICK RUOPP, OF MARSHALLTOWN, IOWA, ASSIGNOR TO MARSHALLTOWN MANUFACTURING COMPANY, OF MARSHALLTOWN, IOWA, A CORPORATION OF IOWA

PRESSURE GAUGE

Application filed March 20, 1928. Serial No. 263,063.

The object of my invention is to provide a pressure gauge of simple, durable and inexpensive construction, particularly adapted to be used in connection with ascertaining the pressure of pneumatic tires.

More particularly it is the object of my invention to provide in a pressure gauge, of that type employing a Bourdon tube and a pivoted index member, improved means for operating and resetting the index member, and improved means for permitting the index member to rest at the position indicating the pressure of the tire at the time the gauge is applied to the valve stem, after the gauge has been removed, to assist in reading the gauge.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a front elevation of my improved gauge.

Figure 2 is a sectional view showing the dial and index finger removed and the chuck in section.

Figure 3 is a detail sectional view taken on the line 3—3 of Figure 1.

Figure 4 is an end elevation of the index member and the operating link.

Figure 5 is a view illustrating the index member as it is stamped from a flat piece of sheet metal, and before it is folded to its operative form.

My improved device comprises a cylindrical casing 10 having a circumferential slot 11 in its side member. A support 12 is provided which is formed preferably of square stock inserted through an opening 13 in said side member. The outer end of the support 12 is turned to form a comparatively small neck portion 14. An opening 15 is provided to form an air passage to connect with the Bourdon tube 16, which has one end mounted in the support 12. The outer end of the support 12 is provided with a chuck 17 of the ordinary construction. The neck 14 of the support is bent to place the chuck 17 on a slight angle with the inner portion of the support, which is mounted radially within the casing. This permits the chuck to be more easily applied to the valve stem of a pneumatic tire used on automobile wheels of small diameter.

The inner end of the support 12 is provided with a dial 18 secured in position by means of suitable rivets 19. The inner edge of said dial plate 18 is provided with a lug 20 upturned to provide a stop for the index finger 21 pivotally mounted on a pivot screw 22, said screw being secured in the support 12 at a point approximately midway between the inner edge of the dial 18 and the opposite side of the casing 10.

In Figure 5 I have illustrated what I shall term the dial member as blanked from a piece of flat sheet metal. Said dial member comprises hub portions 23 and 24, each of which has a pivot opening 25. Said hub portions are connected by a narrow strip 26, the hub portion 24 terminating in the index finger 21.

The hub 23 is provided with what I shall term a bendable arm 27 formed substantially concentric with the opening 25, one end of said member 27 connecting the hub by a curved neck portion 28. The outer end of the member 27 is bent laterally to provide a lug 29. The hub 23 is also provided with a resetting lever 30.

In forming the index member, the strip 26 is bent to place the hubs 23 and 24 in position opposite each other with the openings 25 in alinement, in the manner illustrated in Figure 4. Said openings 25 are designed to receive the pivot pin 22.

The hub portions are spaced apart a considerable distance, so that two point bearings are provided on the pivot member, to prevent lateral movement of the free end of the index finger, thereby providing a cheap and light construction, and means whereby the index finger will swing freely about the pivot member 22 without moving in contact with the dial 18. When the index member is mounted on the post 22, the resetting lever 30 is extended through the slot 11 with its outer end outside of the casing a slight distance.

A link 31 is provided for operatively connecting the free end of the Bourdon tube with the arm 27. Said link has one end pivoted to the Bourdon tube and its opposite end provided with a longitudinal slot 32 for receiving the lug 29 of the arm 27. Said lug 29 rests in the outer end of the slot 32 when the index member 21 is in its zero position against the lug 20.

A leaf spring 33 is provided which is bent with its ends overlapping, one of the ends being bent to form a recess 34 to receive the strip 26 when the spring 33 is inserted between the said strip 26 and the pivot 22, in the manner clearly illustrated in Figure 2. The other end of the spring 33 is designed to frictionally engage the pivot member 22 which is fixed in the suport 12 against rotation. By this arrangement it will be seen that if the index member is rotated on the pivot, the said index member will be frictionally retained at its maximum position of movement.

By providing the bendable arm 27 I have provided means whereby the radial distance between the center of the pivot 22 and the lug 29 may be increased or decreased, and thereby provide means whereby the relative angular movement between the index finger and the free end of the Bourdon tube may be varied; or the member 27 may also be bent to swing the lug 29 in a circumferential path about the pivot 22 for adjusting the initial operating position of the index 21; or, in other words, to adjust the lug 29 so it will rest in the outer end of the slot 32 when the index member 21 is at its zero position.

In practical operation, the chuck 17 is placed over the valve stem of a tire on which a pressure reading is to be taken. The application of said chuck causes the valve stem to open, permitting a small quantity of air from the tire to enter the Bourdon tube, which will be expanded, causing its free end and the link 31 to move in a clockwise direction, which in turn will cause the index member 21 to move in a clockwise direction and also the resetting lever 30. The chuck may be removed after it has been placed in position for a few seconds. The removal of the chuck permits the air within the Bourdon tube to escape and the Bourdon tube to be contracted, at which time its free end and the link 31 will move in a counter-clockwise direction to its initial position without moving the index 21, which is frictionally retained in its maximum position of movement by the spring 33, which is permitted on account of the lost motion action between the link 31 and the arm 27 through the lug 29 and the slot 32.

After the reading of the pressure gauge has been taken by the operator, the index member 21 may be reset to its normal position by the operator placing his thumb on the outer end of the lever 30 and rotating it in a counter-clockwise direction until the finger 21 engages the lug 20.

Thus it will be seen that I have provided a pressure gauge of simple, durable and inexpensive construction, which is very reliable in its operation and which may be easily and quickly adjusted so the index finger will properly register on the graduated scale of the dial; and further provided with means whereby the index finger may be easily and quickly returned to its normal position.

I claim as my invention:

1. A pressure gauge including a casing having a circumferential slot, a support, a dial, a Bourdon tube and an index member, said index member including a pair of oppositely arranged hub members having pivot openings and connected in spaced relation, one of said hub members having an index finger, the other hub member including a resetting lever and a bendable arm, means for pivotally mounting said index member within the casing with the resetting lever projected through the slot in said casing, a link pivotally connected to the free end of said Bourdon tube, and lost motion means for connecting the free end of said link to the end of said bendable arm.

2. In a pressure gauge having a Bourdon tube, an index member including a pair of oppositely aranged hub members having pivot openings and connected in spaced relation, one of said hub members having an index finger, the other hub member including a resetting lever and a bendable arm, a pivot for said openings, and means for connecting one end of the bendable arm to the movable end of said Bourdon tube.

3. In a pressure gauge, a support, a pivot member, an index member including a pair of oppositely arranged hub members having pivot openings and connected in spaced relation, one of said hub members having an index finger, the other hub member including a resetting lever and a bendable arm, said hub members being pivotally mounted on said pivot member, and a substantially U-shaped spring having one end secured to the member connecting said hub members, and its other end in frictional engagement with said pivot member.

4. A pressure gauge including a support, a fixed pivot member, a Bourdon tube, an index member adapted to swing about said pivot member, lost motion means for connecting said index member with the free end of said Bourdon tube, and a spring carried by said index member, adapted to swing therewith and having one end in frictional engagement with said pivot member.

5. In a pressure gauge, a support, pressure operated mechanism, an index member formed of sheet metal stamping having hub portions provided with pivot openings and connected by a narrow strip, one of said hub portions terminating in an index finger, the other hub portion being provided with a curved and bendable arm, the curvature of which is approximately concentric with the axis of one of the pivot openings, and also provided with a substantially radially projecting resetting lever, said connecting strip being bent to place the hub members in overlapping and spaced relation with the pivot openings in common alinement, a pivot member mounted on said support and carrying the index member, a spring supported between the connecting strip and said pivot member, and means for operatively connecting said bendable member with said pressure operated mechanism.

GEORGE FREDERICK RUOPP.